(12) United States Patent
Dorsch et al.

(10) Patent No.: US 8,348,188 B2
(45) Date of Patent: *Jan. 8, 2013

(54) INTERNAL CUTTER ON SUBMERSED MIXER

(75) Inventors: Glenn R. Dorsch, Aberdeen, WA (US); Kent H. Keeran, Elma, WA (US); Yee Chak, Hoquiam, WA (US)

(73) Assignee: Vaughan Company, Inc., Montesano, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,452

(22) Filed: Oct. 14, 2011

(65) Prior Publication Data

US 2012/0061500 A1    Mar. 15, 2012

Related U.S. Application Data

(63) Continuation of application No. 12/721,602, filed on Mar. 11, 2010, now Pat. No. 8,118,244.

(51) Int. Cl.
*B02C 19/00* (2006.01)

(52) U.S. Cl. ............................... 241/46.017

(58) Field of Classification Search ............ 241/21, 241/186.5, 46.06, 46.017; 415/121.1
See application file for complete search history.

(56) References Cited

U.S. PATENT DOCUMENTS

| 3,096,718 | A | * | 7/1963 | Anderson | 415/121.1 |
| 4,434,943 | A | * | 3/1984 | Deal | 241/46.08 |
| 8,118,244 | B2 | * | 2/2012 | Dorsch et al. | 241/21 |

* cited by examiner

*Primary Examiner* — Mark Rosenbaum
(74) *Attorney, Agent, or Firm* — Bishop & Diehl, Ltd.

(57) ABSTRACT

A mixing system for a fluid tank is described, the system having a drive motor, an impeller, a shroud enclosing the impeller and a cutter mounted on the shroud to cut solids. The shroud is open at inlet and discharge ends for drawing in and discharging fluid from the tank. A recess is provided on the internal surface of the shroud, wherein the cutter is adjustably positioned within the recess. The cutter is detachable from the recess to allow replacement. In use, homogeneity is maintained in a slurry contained within the tank by submerging the impeller such that the cutter cooperates with the impeller to cut solids within the slurry, drawing tank contents into the impeller at the inlet, cutting material between the cutter and blade, and then discharging the material.

11 Claims, 4 Drawing Sheets

INTERNAL CUTTER ON SUBMERSED MIXER

RELATED APPLICATION

The present application is a continuation of, and hereby incorporates by reference, U.S. application Ser. No. 12/721,602 titled "Internal Cutter On Submersed Mixer" filed on Mar. 11, 2010, and now U.S. Pat. No. 8,118,244.

TECHNICAL FIELD OF THE INVENTION

The present device relates to a mixing impeller used to create and maintain homogeneity in a slurry. Particularly, the present device relates to such a mixer with increased reliability and durability.

BACKGROUND OF THE INVENTION

A slurry is a liquid mixture, typically comprised of water and soluble and insoluble solid materials. Without agitation, a slurry will separate over time with the solid and liquid attaining distinct levels in a container. Separation in some instances is undesirable. That is, homogenizing a slurry may have various advantages for different fields. For example:

(1) animal manure management, a homogenous slurry is much easier to pump reliably, particularly in screening systems where manure is pumped over a screen to separate into liquid and solid components;

(2) wastewater treatment, a homogenous wastewater slurry in a treatment plant benefits the biological breakdown of human waste. Likewise, in aerobic digestion, oxygen can be added and mixed into a wastewater slurry to facilitate digestion;

(3) food processing such as wine making, a homogenous slurry of grape skins with wine during fermentation can improve the taste of the wine;

(4) bio-waste management (i.e., fats, oils, and greases combined with commercial and household food waste and possibly with animal manure to generate biogas) a homogenous slurry can help improve various stages of the process; and (5) manufacture of fuels, such as fuel oils, bio-diesel and ethanol, a homogenous slurry can be helpful in improving the process.

Accordingly, mixers have been used to create and maintain homogeneity in slurries.

The first of such mixers were used on farms and the like to mix manure pits and lagoons. This early portable mixer was typically mounted on and driven by a tractor. Later, belt-driven AC electric motor mixers came about for use in large tanks. However, these open impeller systems only worked well when slurry level was high in the tank. Low slurry levels resulted in vortexing and diminished mixing effectiveness. Further, materials such as hair, fabrics, sludge and the like tended to wrap around the impeller and impeller shaft causing seal failures and leading to high maintenance expenses.

A system was needed to address the problems of low slurry levels and string-like solids. A system which could operate effectively at slurry levels below four feet, and even down to a foot of slurry was sought by those of skill in the art. A system which could reduce the impact of wrapping solids to minimize maintenance expenses was equally sought.

The present invention addresses these and other problems associated with prior mixing systems. The present invention provides both a system and a method for obtaining and maintaining a homogenous slurry in a tank.

SUMMARY OF THE INVENTION

There is disclosed herein an improved submersed impeller mixer which avoids the disadvantages of prior devices while affording additional structural and operating advantages.

Generally speaking, a mixing system for a fluid tank is described herein, the system comprising a drive motor, a submersed impeller, a shroud having a sidewall enclosing the impeller, and a cutter mounted on the shroud and cooperating with a blade of the impeller to cut solids within the shroud. The shroud is open at both an inlet end and a discharge end for drawing in and discharging fluid from the tank.

In an embodiment, a recess is provided on the internal surface of the shroud, wherein the cutter is adjustably positioned within the recess. Additionally, the cutter is also detachable from the recess so that it may be replaced when worn.

A method for creating or maintaining homogeneity in a slurry contained within a tank is also disclosed. The method comprises the steps of submerging an impeller into the slurry, the impeller being shrouded in a housing having an inlet opening and a discharge opening, securing a cutter on an internal surface of the housing such that during operation of the impeller the cutter cooperates with a blade of the impeller to cut solids within the slurry, drawing tank contents into the impeller at the inlet opening, cutting solid material in the drawn tank contents between the cutter and an impeller blade, and then discharging the drawn tank contents out the discharge opening back into the tank.

In an embodiment of the invention, the inlet opening and the discharge opening are substantially perpendicular to one another, which facilitates mixing of the slurry as well. The height of the cutter may be adjusted to an optimum cutting position by adding shims beneath the cutter.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
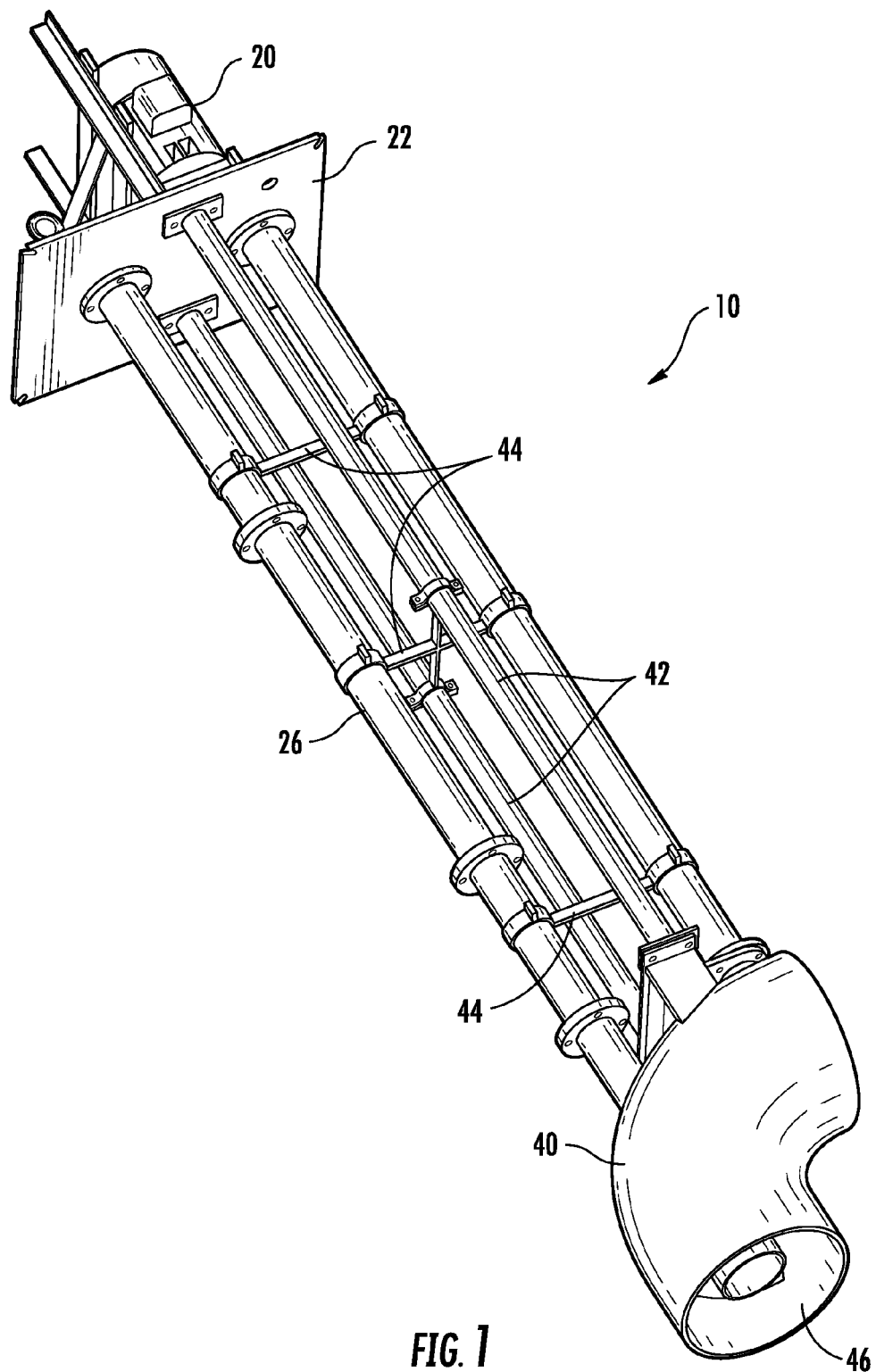
FIG. 1 is a perspective view of an embodiment of the present mixing system.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-6, there is illustrated a mixing system, generally designated by the numeral 10, and components thereof. The system 10 is designed for use in combination with a fluid tank of most any size and dimension. While the term "tank" is used throughout the following description, with sufficient modification, the system 10 may be used in combination with other man-made or natural bodies of liquid retained in, for example, pits, lagoons, pools, ponds, and the like. Accordingly, the use of "tank" or "container" below should be understood to include these other configurations as well.

Figure 2:
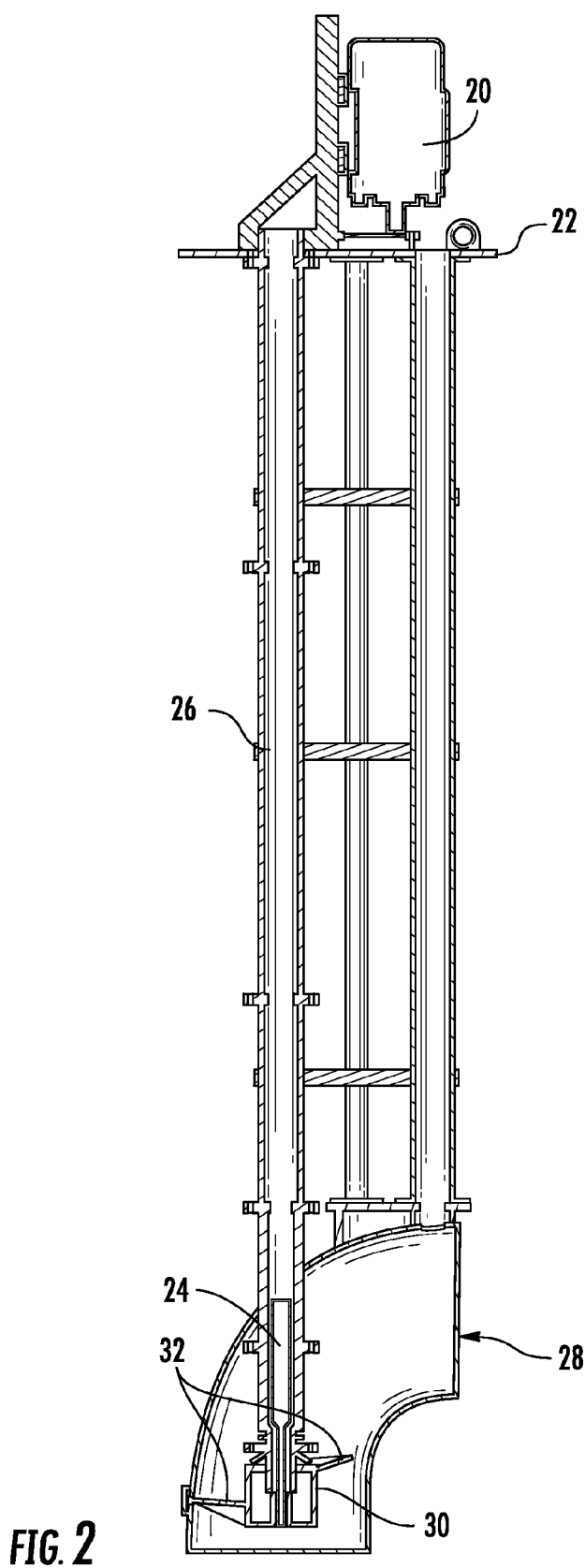
FIG. 2 is a side cross-sectional view of the embodiment of the mixing system shown in FIG. 1.

FIGS. 1 and 2 illustrate an embodiment of the system 10 which might be used in, for example, a large holding or storage tank having a cover or the like. The system 10 includes a drive motor 20 positioned on a platform 22 where it connects to a drive shaft 24. The platform 22 would provide support for the motor 20 as it mounts above a liquid body, preferably to the tank lid or cover (not shown). The drive shaft 24 extends down from the platform 22 enclosed within an oil-filled column 26. At the extended end of the drive shaft 24 is an impeller 30 having a plurality of blades 32 for mixing the liquid.

The impeller 30 is positioned on the drive shaft 24 so as to turn in a plane substantially parallel to the tank bottom (not shown) and perpendicular to the drive shaft 24. A particular embodiment utilizes a 17 inch (43.2 cm) axial-flow propeller for impeller 30. However, larger and smaller impeller configurations are easily adapted for use. For example, a 22 inch (55.9 cm) or larger impeller or a 10 inch (25.4 cm) or smaller impeller could be used with proper structural modifications, all of which would certainly be understood by those of skill in the art from a reading of the present disclosure.

Further, the impeller 30 is housed within a shroud 40 supported by the platform 22 via vertical braces 42 extending between the two components. Cross-linking braces 44 are also used to add further stabilization to the vertical braces 42 of the system 10. The combination of the shroud 40 and the impeller's horizontal orientation allows the present mixing system 10 to be used effectively in tanks having low liquid levels—i.e., below about four feet of liquid, and down to approximately one foot of liquid in the tank—without vortexing. Vortexing not only degrades the mixing effectiveness of the system, but can also cause vibrational instability which can lead to mechanical breakdowns.

The shroud 40 is shown to be an 18 inch (45.7 cm) long radius forged steel elbow having an inlet opening 46 at one end and a discharge opening 48 at the opposite end. The inlet opening 46 and discharge opening 48 are perpendicular as a result of the elbow. The horizontal discharge facilitates mixing of the slurry as well.

Figure 3:
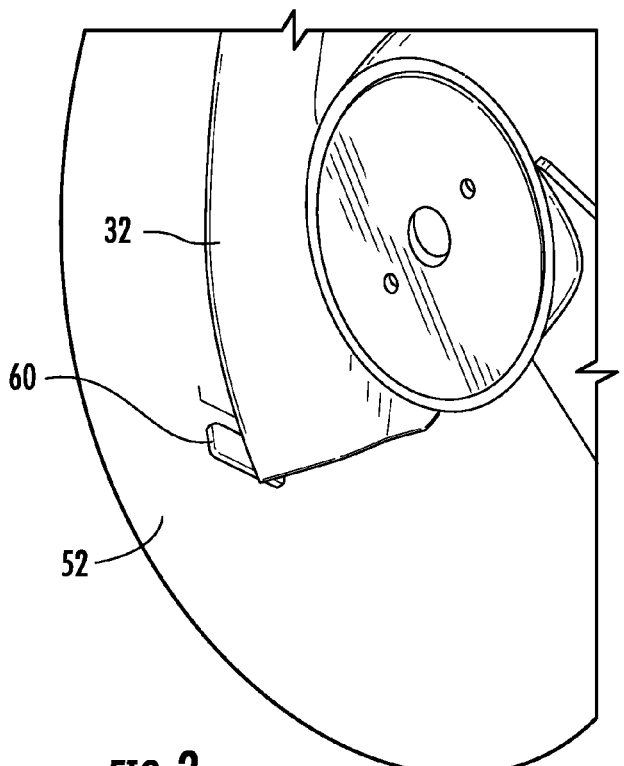
FIG. 3 is a partial bottom view of an embodiment of the impeller cutting across the cutter.
Figure 4:
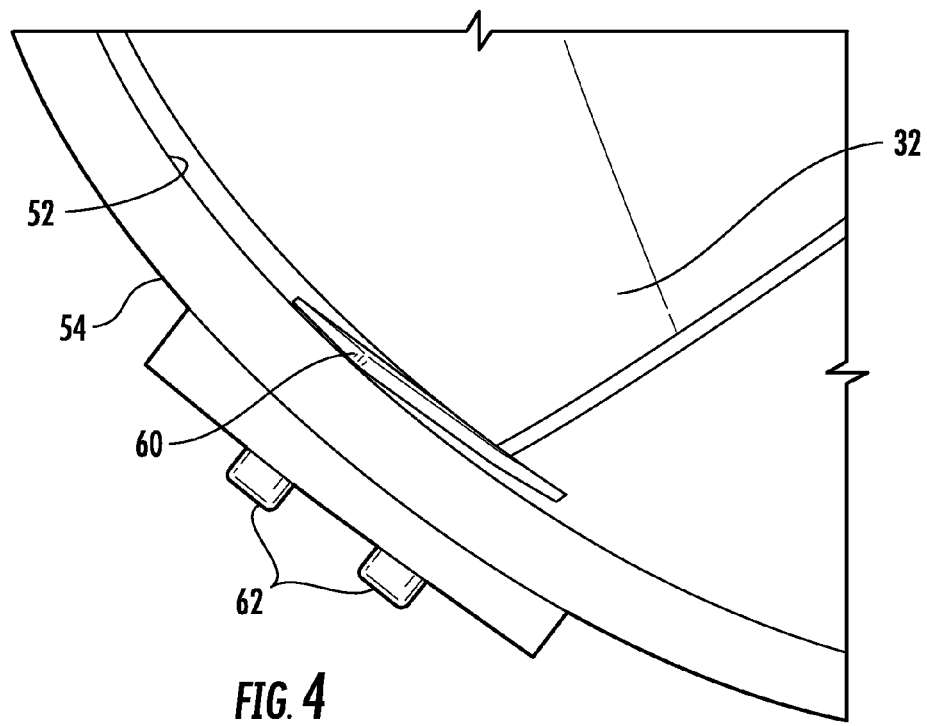
FIG. 4 is a close-up of the impeller and cutter illustrating the cooperation between the two components to cut solids.
Figure 5:
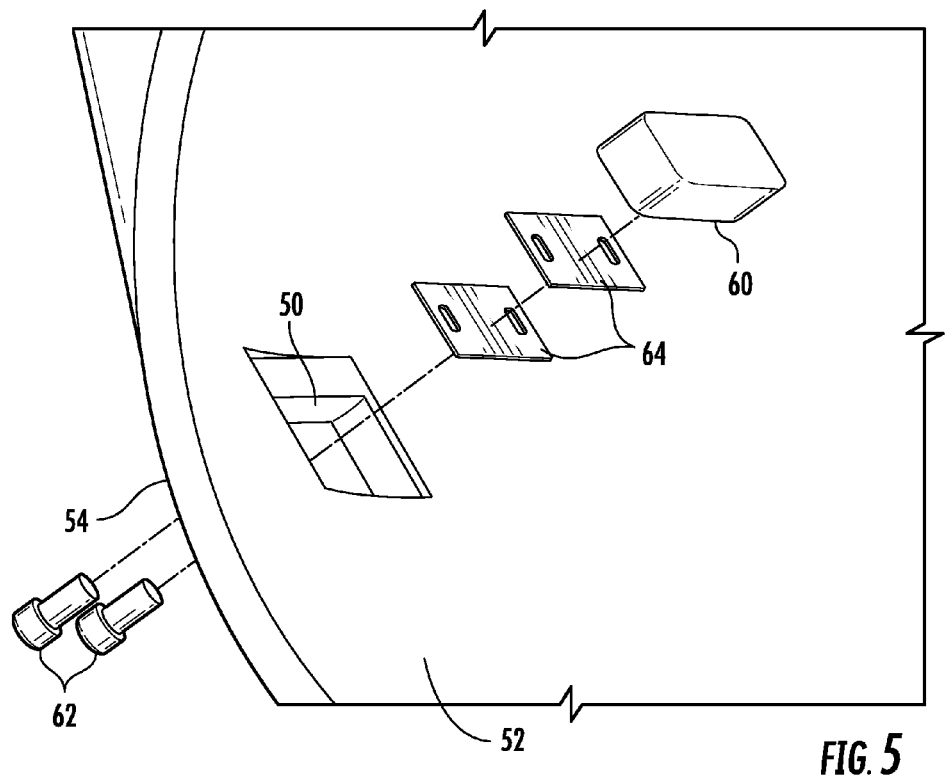
FIG. 5 is an exploded view of an embodiment of the insert cutter as it would attach to the impeller housing.

Within the shroud 40, attached within a recess 50 on an internal surface of the housing wall 52 as shown in FIGS. 3-5, is positioned a cutter 60. In the present embodiment, the clearance (gap) between the internal surface 52 of the shroud 40 and an outermost edge of an impeller blade 32 is approximately 0.5 inch (1.27 cm). The cutter 60 is preferably mounted using two bolts 62 from the outer surface 54 of the shroud 40. Threaded openings in the cutter 60 allow easy attachment and removal of the cutter 60 from the outer surface of the shroud 40 via the bolts 62.

The cutter 60 extends a height above the internal surface of the shroud 40, which is less than the approximate 0.5 inch gap. The height may be adjusted by inserting and removing shims 64 from the recess 50 beneath the cutter 60.

Figure 6:
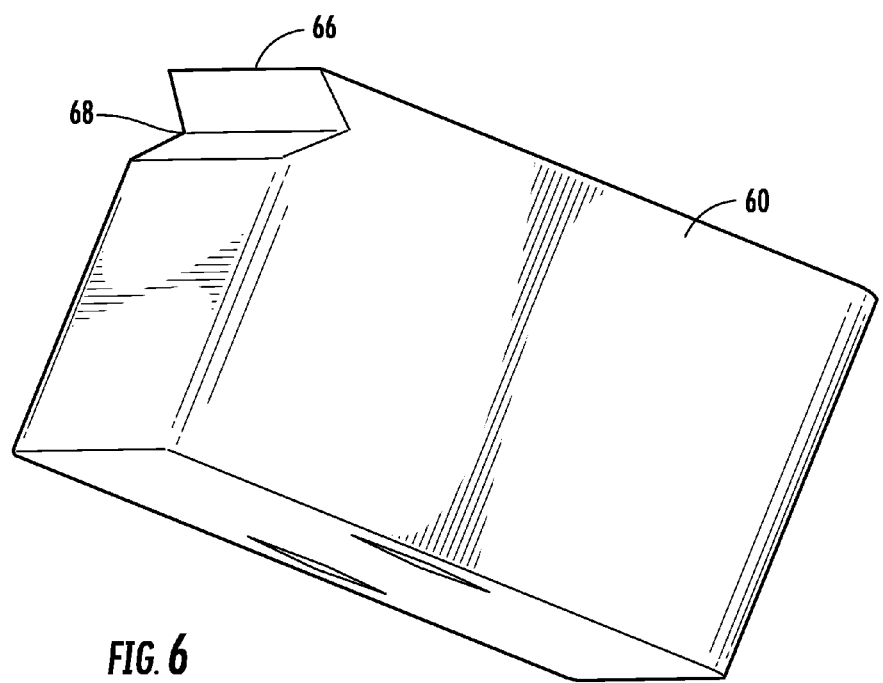
FIG. 6 is a perspective view of an embodiment of the cutter.

As shown in FIG. 6, the cutter 60 is rectangular with a sharp cutting edge 66 as a result of a V-shaped groove 68 just under one edge of the bar 60. Of course, the bar 60 may be any suitable size and shape. Further, the cutting edge 66 should be maintained sufficiently sharp for cutting operations. As the cutting edge 66 becomes worn, the cutter 60 may be removed from the recess 50, and re-sharpened, if possible, or replaced outright, if necessary. For most purposes, a single internal cutter is sufficient, but additional cutters may be warranted for some uses. Caution should be maintained with added cutters, as they may create greater binding occurrences of the impeller 30 leading to a greater failure rate of the system 10 if the sharpness and close cutting clearances are not maintained, as described below.

Before use and installation, the desired height of the cutter 60 may be determined to cooperate most effectively with the impeller blade 32 so as to cut solid material drawn into the shroud inlet opening 46. It has been found that the clearance between the impeller blade 32 and the cutter 60 provides optimal operation when kept in the range of from about 0.010 to about 0.015 inch (0.025 to about 0.038 cm). Clearances of greater than 0.030 inch (0.076 cm) have been found to cause an increase in binding.

Properly gapped, the system 10 can then be installed by mounting the platform 22 and attached drive motor 20 above a desired tank surface. The shroud covered impeller 30 is submerged into the tank slurry, being sure the inlet opening 46 and a discharge opening 48 are properly positioned. The cutter 60, properly shimmed to provide the desired height, is secured on the internal surface 52 of the housing such that during operation of the impeller 30 the cutter 60 cooperates with a blade 32 of the impeller 30 to cut solids within the slurry. Activation of the drive motor 20 turns the impeller, via the drive shaft 24, at a relatively low speed in the range of from about 400 rpm (using a 7.5 hp motor) to about 570 rpm (using a 20 hp motor). Tank contents are drawn into the shrouded impeller 30 at the inlet opening 46. Solid material in the content would be cut between the cutter 60 and the impeller blade 32 to prevent wrapping about the drive shaft 24, and to prevent binding between the impeller 30 and the shroud 40. Then, the drawn content is discharged through the outlet opening 48 of the shroud 40.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A mixing system for maintaining homogeneity in a slurry contained within a fluid tank, the mixing system comprising:
   a drive motor;
   an axial flow impeller coupled to the drive motor by a drive shaft and configured to turn at a speed within the slurry as driven by the motor;
   a shroud having a sidewall for enclosing the impeller, the shroud being configured to draw a flow of the slurry into an inlet end and discharge the slurry at a discharge end; and a cutter mounted within a recess on an internal surface of the shroud sidewall and positioned to cooperate with a blade of the impeller to cut solids within the slurry.

2. The mixing system of claim 1, wherein the cutter is adjustably positioned within the recess.

3. The mixing system of claim 2, wherein the cutter is detachable from the recess.

4. The mixing system of claim 3, wherein the cutter is attached within the recess from an external surface of the shroud.

5. The mixing system of claim 4, wherein the cutter attaches within the recess to extend a distance above the internal surface of the shroud and the distance is adjustable.

6. The mixing system of claim 5, wherein at least one shim is attached between the cutter and the recess to adjust the distance.

7. The mixing system of claim 1, wherein the cutter comprises a cutting face having a V-groove to create a cutting edge.

8. The mixing system of claim 1, wherein the impeller is coupled to a vertical drive shaft and turns in a horizontal plane.

9. The mixing system of claim 8, wherein flow into the mixer is axial to the impeller.

10. The mixing system of claim 1, wherein the inlet opening defines a first plane and the discharge opening defines a second plane, and the first plane is perpendicular to the second plane.

11. The mixing system of claim 1, wherein the drive motor is mounted remotely from the impeller.

* * * * *